United States Patent [19]

Rogut

[11] Patent Number: 5,716,689
[45] Date of Patent: Feb. 10, 1998

[54] HOLLOW FIBER MEMBRANE CARPET MANUFACTURING METHOD AND AN ELEMENTARY CARPET MEMBER AND CARPET

[75] Inventor: Jan Rogut, Cincinnati, Ohio

[73] Assignee: Integrated Process Technologies, Fort Collins, Colo.

[21] Appl. No.: 718,157

[22] Filed: Sep. 19, 1996

[51] Int. Cl.$^6$ .................. A46D 1/00; B32B 5/00; B32B 3/02; B01D 63/00
[52] U.S. Cl. .................. 428/92; 428/95; 156/72; 156/160; 156/199; 156/229; 210/321.87; 210/321.89
[58] Field of Search .................. 428/92, 95; 156/72, 156/168, 199, 229; 210/321.87, 321.89

[56] References Cited

U.S. PATENT DOCUMENTS

| | | | |
|---|---|---|---|
| 3,174,451 | 3/1965 | Heiks | 428/92 |
| 3,266,969 | 8/1966 | Makansi | 428/92 |
| 3,511,745 | 5/1970 | Holzknecht | 428/92 |
| 3,607,588 | 9/1971 | Soehngen et al. | 428/92 |
| 3,928,694 | 12/1975 | Reinhard | 428/92 |
| 3,947,306 | 3/1976 | Haemer | 428/92 |
| 5,238,562 | 8/1993 | Rogut | 210/321.89 |
| 5,284,583 | 2/1994 | Rogut | 210/321.8 |
| 5,328,610 | 7/1994 | Rogut | 210/321.8 |
| 5,332,498 | 7/1994 | Rogut | 210/321.8 |

OTHER PUBLICATIONS

Fabrication of Hollow Fibre Gas Separation Membranes, P.S. Puri, Gas Sep. & Pur. 1990 vol. 4 Mar.

Primary Examiner—Terrel Morris
Attorney, Agent, or Firm—Flanagan & Flanagan

[57] ABSTRACT

A method of manufacturing a hollow fiber membrane carpet includes the steps of laying out a multiplicity of hollow fibers, forming a pair of strips of non-permeable adhesive material on the hollow fibers in a transverse relationship thereto and in a spaced relationship from one another such that main portions of the hollow fibers extend between the spaced strips, cutting selected portions of the hollow fibers adjacent to the spaced strips so as to open the hollow fibers to communication at least at one of a pair of opposite end portions of the hollow fibers, and assembling the hollow fibers and spaced strips into a plurality of elementary carpet members and thereafter into a hollow fiber membrane carpet. Assembling the carpet is performed by bringing and attaching the strips together in a side-by-side relationship so as to form the elementary carpet members each having an elongated base element formed by the attached strips and a multiplicity of loops formed by the hollow fibers with the main portions thereof extending from the base element and the opposite end portions thereof supported in the base element, and then positioning together the elementary carpet members to provide the hollow fiber membrane carpet by attaching in side-by-side relationships the base elements of adjacent elementary carpet members to form a support base of the hollow fiber membrane carpet with the hollow fiber loops extending outwardly from a side of the support base.

36 Claims, 3 Drawing Sheets

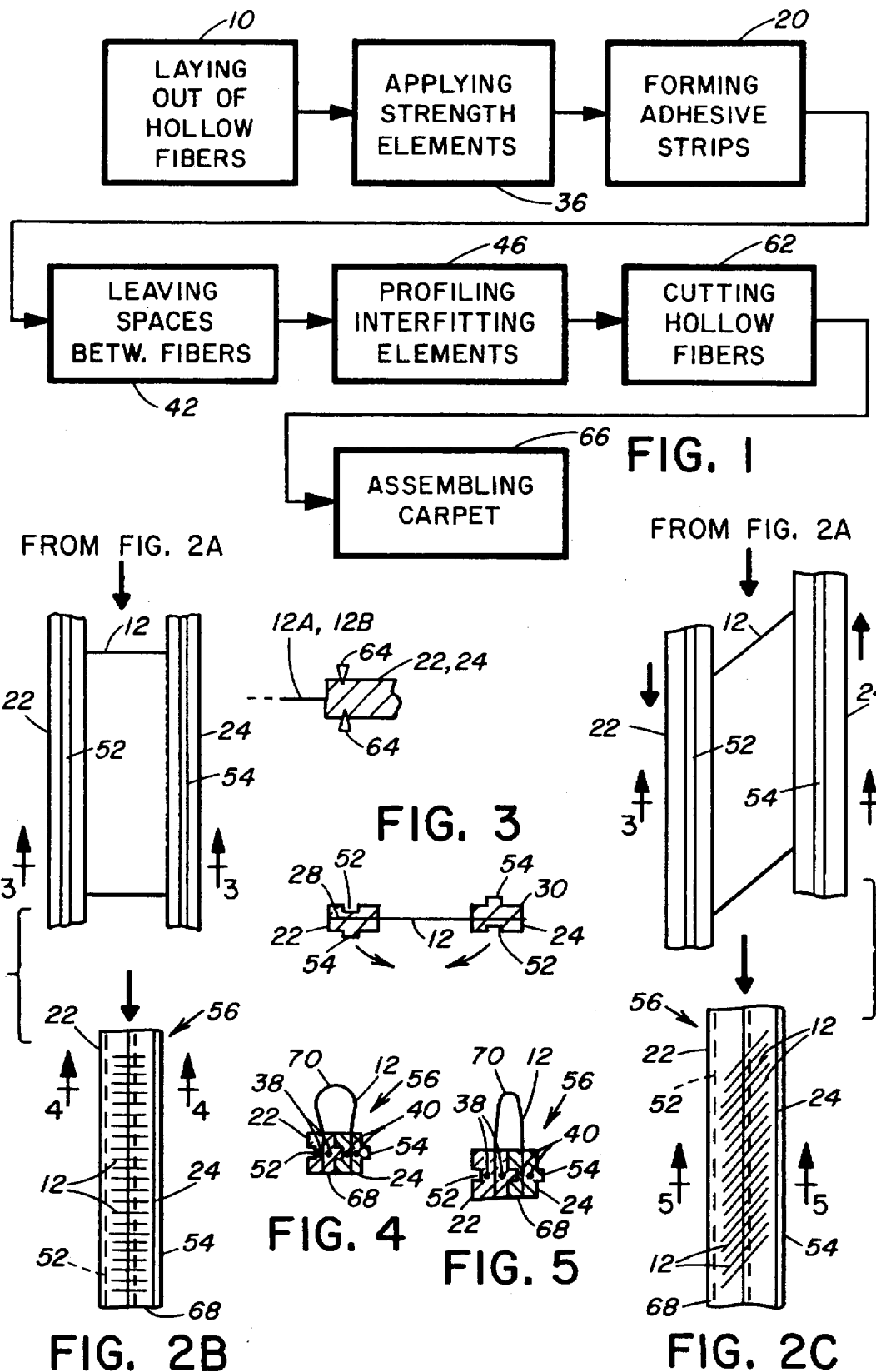

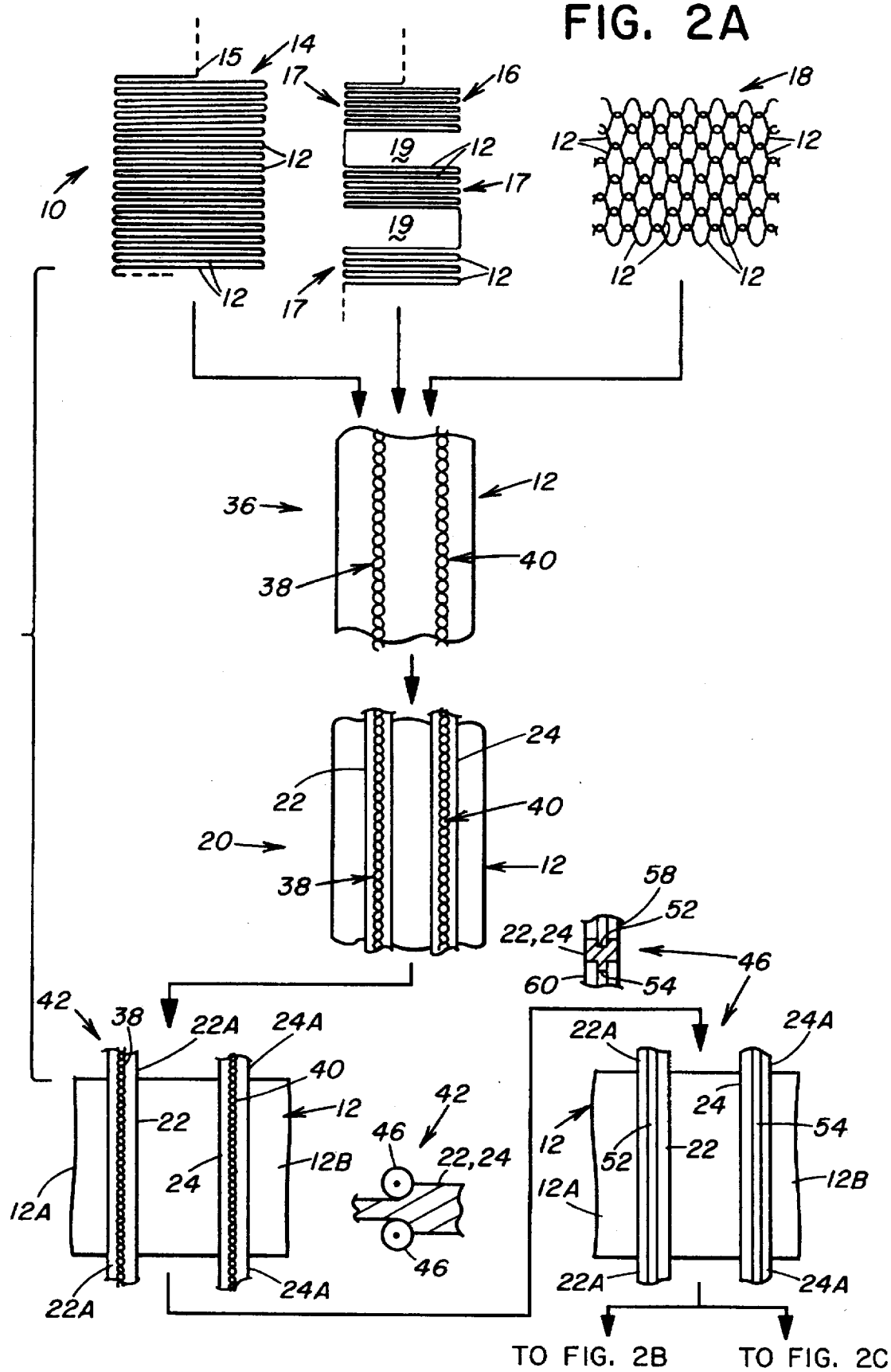

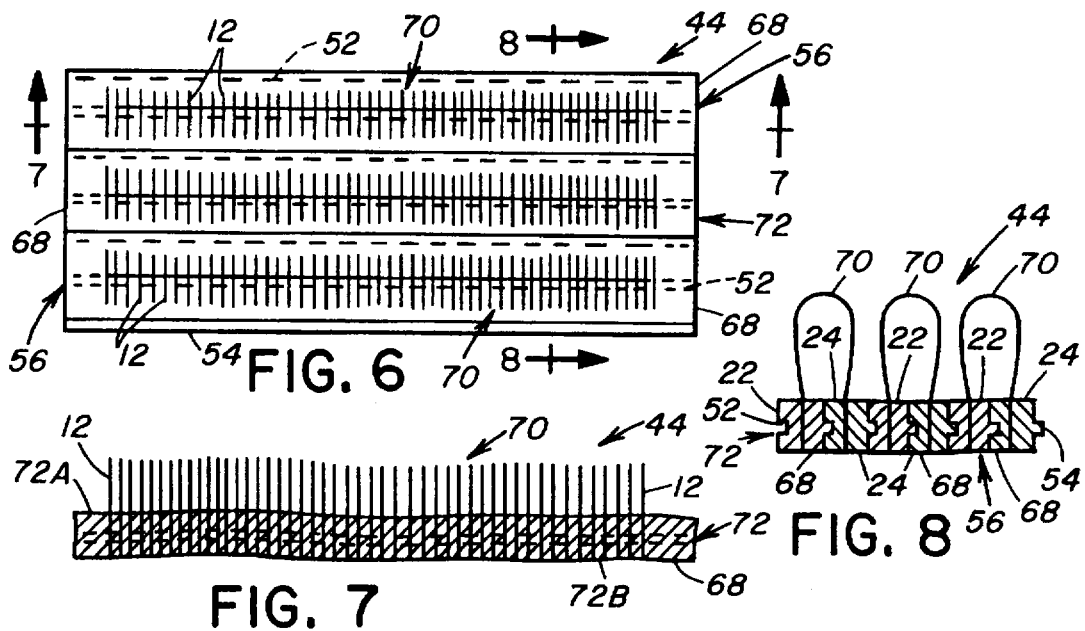
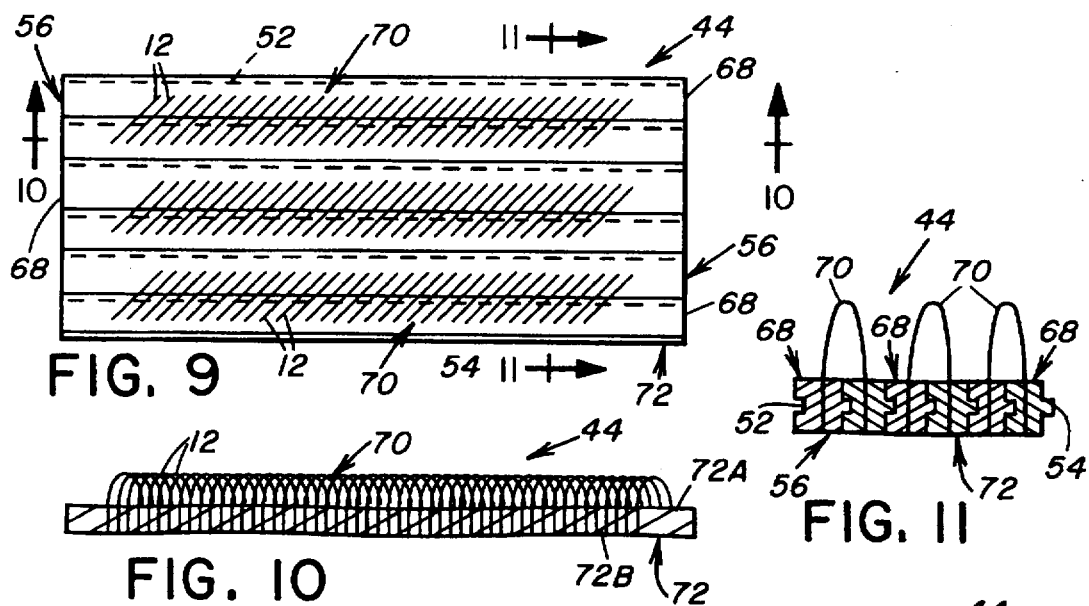
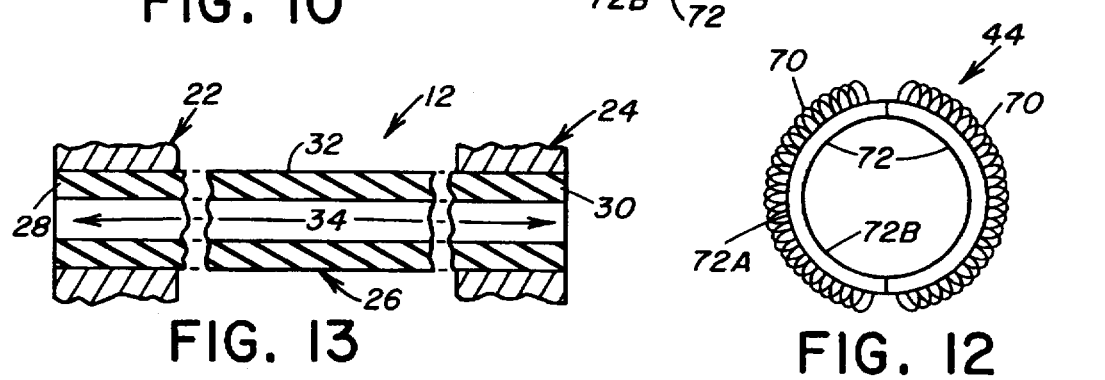

HOLLOW FIBER MEMBRANE CARPET MANUFACTURING METHOD AND AN ELEMENTARY CARPET MEMBER AND CARPET

TECHNICAL FIELD

The present invention generally relates to membrane separation processes employing hollow fiber membrane technology and, more particularly, is concerned with a hollow fiber membrane carpet manufacturing method and with an elementary carpet member and a carpet assembled from a plurality of elementary carpet members.

BACKGROUND ART

Processes of fluid separations carried out on membranes, permselective thin layers of polymeric or ceramic materials, belong to the most rapidly developing fields of chemical and environmental technologies. The efficiency of membrane separations depends on process parameters, properties of membrane materials, and the form and geometry of membranes. Hollow fibers, the microtubes with capillary range of diameters, are one of the major forms of membranes. Their production utilizes the know-how and technical hardware of melt or solution spinning methods of the chemical fibers industry. Some ways of producing hollow fiber membranes appear in an article in Gas Separation & Purification, March 1990, Vol. 4, pages 29–36, by P. S. Puri, entitled "Fabrication of hollow fibre gas separation membranes".

Hollow fiber membranes are under broad exploitation in the desalination of sea water (reverse osmosis), gas separation (air separation to oxygen enriched air or to nitrogen enriched air), medicine (artificial kidney) and many other industrial, environmental and agricultural applications. The size of the world market for membrane systems and processes are experiencing a rapid growth of about 15–30% per year. The total market value of products and processes based on membranes is estimated to be on the level of $5 billion by the year 2000.

Hollow fiber membrane technology in textile forms were first disclosed by the inventor in U.S. Pat. Nos. 5,238,562, 5,284,583, 5,328,610 and 5,332,498. These hollow fiber textile forms follow the known classic structures of textiles: hollow fiber knitted textile, hollow fiber curtains, hollow fiber carpets, hollow fiber velours and other similar ones. The inventions of these patents were originated by the inventor herein through the merging of his insights and experiences in the fields of textile and membrane technologies.

Particularly, hollow fiber membrane carpets useful for air separation purposes have been described in detail in the above-cited U.S. Pat. Nos. 5,238,562 and 5,284,583. The technical feasability of these hollow fiber textile forms follows from the experimentally proven possibility of building membrane systems from extremely small hollow fibers, such as with outside diameters from 30 to 50 microns and inside diameters from 10 to 20 microns, without paying the price of causing unacceptably large pressure drops by the flow of raw mixtures or product fluids through small internal channels of capillaries. The known problems of back pressure effects and polarization phenomena in membrane systems have been limited substantially by the use of short hollow fibers, such as with lengths of 1.5 to 25 centimeters.

The most important practical advantage of the hollow fiber textile forms disclosed by these patents derives from their ability to be produced on a large technical scale by conventional textile manufacturing machines through replacement of "normal" fibers with hollow fibers. In this way, the capital costs for manufacturing hollow fiber membrane systems can be decreased significantly making these membrane systems low cost but high quality and thereby more competitive in a broader range of applications.

However, notwithstanding the substantial potential benefits to be derived particularly from the new hollow fiber membrane carpet forms, the inventor herein has faced substantial resistance from manufacturers to undertaking production on a large scale basis without first having confirmation of these benefits from actual uses. Thus, there is a need for further innovations in the design and manufacture of hollow fiber membrane carpets so as to bring them into practical use so that their benefits can be conclusively demonstrated and realized.

DISCLOSURE OF INVENTION

The present invention provides a hollow fiber membrane carpet manufacturing method and an elementary carpet member and carpet assembled from a plurality of the elementary carpet members. The carpet manufacturing method of the present invention permits production of a hollow fiber membrane carpet in an automated fashion on a technical scale that is flexible and thus adaptable to the needs and requirements of any given application. At the core of the manufacturing method of the present invention is a modular approach to carpet production that facilitates its adaptability to specific user requirements and needs. The modularity of the approach relates to the elementary carpet members that are manufactured and assembled together by the method of the present invention to provide a hollow fiber membrane carpet having a desired size and configuration tailored particularly to a desired application. This modular approach promotes a high flexibility and adaptability in hollow fiber membrane carpet production which could not be realized by using conventional industrial carpet manufacturing machines and methods without costly modifications.

Accordingly, the present invention is directed to a method of manufacturing a hollow fiber membrane carpet, comprising the steps of: (a) laying out a multiplicity of hollow fibers; (b) forming a pair of strips of non-permeable adhesive material on the hollow fibers in a transverse relationship thereto and in a spaced relationship from one another such that main portions of the hollow fibers extend between the spaced strips; (c) cutting selected portions of the hollow fibers adjacent to the spaced strips so as to open the hollow fibers to communication at least at one of a pair of opposite end portions of the hollow fibers; and (d) assembling the hollow fibers and spaced strips into a hollow fiber membrane carpet. The assembling of the carpet is performed by (i) bringing and attaching the strips together in a side-by-side relationship to one another so as to form elementary carpet members each having an elongated base element formed by the attached strips and a multiplicity of loops formed by the main portions of the hollow fibers extending from the opposite end portions thereof supported in the base element of the elementary carpet member, and (ii) positioning together the elementary carpet members to form the hollow fiber membrane carpet by attaching in side-by-side relationships to one another the base elements of adjacent elementary carpet members to form a support base of the hollow fiber membrane carpet with the hollow fiber loops of the elementary carpet members extending outwardly from one side of the support base.

More particularly, the bringing of the strips together includes offsetting the strips in opposite directions from one another along their longitudinal extents prior to attaching the strips together in the side-by-side relationship. The offsetting of the strips longitudinally relative to one another bends the hollow fibers extending between the strips so as to provide a multiplicity of loops which overlap one another and extend in planes disposed at small acute angles to the longitudinal extents of the strips.

In one form, the support base of the hollow fiber membrane carpet is provided in a generally flat or curved configuration with the loops of hollow fibers extending outwardly from one side of the support base and the opposite end portions of the hollow fibers being open at the opposite side of the support base. In another form, the support base of the hollow fiber membrane carpet is provided in an annular configuration with the loops of hollow fibers extending outwardly from an outside of the annular support base and the end portions of the hollow fibers being open at the inside of the annular support base.

The carpet manufacturing method further comprises applying a pair of elongated strengthening elements across the selected adjacent portions of said hollow fibers in a transverse relationship thereto and in a spaced relationship from one another prior to forming the pair of strips of non-permeable adhesive material to thereby encapsulate the strengthening elements with the selected adjacent portions of the hollow fibers by the strips such that the strengthening elements extend longitudinally through the respective strips. The strengthening elements may be applied by interweaving them between bunches of the hollow fibers. The carpet manufacturing method also comprises coordinating the laying out of the hollow fibers with the applying of the strips to provide segments of the strips free of hollow fibers and that bridge gaps between the hollow fibers such that these segments of the strips can define means for attaching the carpet to external support members. The carpet manufacturing method still further comprises profiling the strips by forming complementary matable interfitting elements on opposite sides thereof so that the strips can be attached to one another to form the elementary carpet member and then the elementary carpet members can be attached to one another to form the hollow fiber membrane carpet.

The present invention also is directed to an elementary carpet member for use in forming a hollow fiber membrane carpet. The elementary carpet member comprises: (a) a pair of strips of non-permeable adhesive material being positioned lengthwise adjacent to one another; (b) means for attaching the strips to one another in a side-by-side relationship to form an elongated base element; and (c) a multiplicity of hollow fibers each having a tubular wall with a pair of spaced opposite end portions and a main portion interconnecting the opposite end portions, the opposite end portions of each of the hollow fibers being supported in respective ones of the strips and extending therefrom through surfaces of the strips disposed side-by-side one another and extending in substantially the same plane, the elongated main portions of the hollow fibers being bent so as to form a multiplicity of loops extending outwardly from a side of the elongated base element formed by the surfaces of the strips.

The present invention further is directed to a hollow fiber membrane carpet which comprises: (a) a plurality of elementary carpet members, each member including (i) a pair of strips of non-permeable adhesive material being positioned lengthwise adjacent to one another, (ii) means for attaching the strips to one another in a side-by-side relationship to form an elongated base element, and (iii) a multiplicity of hollow fibers each having a tubular wall with a pair of spaced opposite end portions and a main portion interconnecting the opposite end portions, the opposite end portions of each of the hollow fibers being supported in respective ones of the strips and extending therefrom through surfaces of the strips disposed side-by-side one another and extending in substantially the same plane, the elongated main portions of the hollow fibers being bent so as to form a multiplicity of loops extending outwardly from a side of the elongated base element of the elementary carpet member formed by the surfaces of the strips; and (b) means for attaching the base elements of the elementary carpet members to one another in a side-by-side relationship to form an elongated support base of a hollow fiber membrane carpet with the hollow fiber loops extending outwardly from a side of the support base.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a block diagram of the hollow fiber membrane carpet manufacturing method in accordance with the present invention.

FIGS. 2A, 2B and 2C are schematic diagrams of the steps of the method involving the manufacturing of elementary carpet members and of the assembling of a hollow fiber membrane carpet therefrom.

FIG. 3 is a cross-sectional view taken along lines 3—3 of FIGS. 2B and 2C showing the spaced strips and hollow fibers extending therebetween before being brought together to make either of two forms of the elementary carpet member of the present invention.

FIG. 4 is a cross-sectional view of one form of the elementary carpet member taken along line 4—4 of FIG. 2B.

FIG. 5 is a cross-sectional view of another form of the elementary carpet member taken along line 5—5 of FIG. 2C.

FIG. 6 is a top schematic diagram of one flat configuration of the hollow fiber membrane carpet of the present invention assembled from a plurality of elementary carpet members having the form of FIGS. 2B and 4.

FIG. 7 is a longitudinal sectional view of the carpet taken along line 7—7 of FIG. 6.

FIG. 8 is an enlarged cross-sectional view of the carpet taken along line 8—8 of FIG. 6.

FIG. 9 is a top schematic diagram of another flat configuration of the hollow fiber membrane carpet of the present invention assembled from a plurality of elementary carpet members having the form of FIGS. 2C and 5.

FIG. 10 is a longitudinal sectional view of the carpet taken along line 10—10 of FIG. 9.

FIG. 11 is a cross-sectional view of the carpet taken along line 11—11 of FIG. 9.

FIG. 12 is an end schematic diagram of an annular configuration of the hollow fiber membrane carpet of the present invention assembled from a plurality of elementary carpet members having the form of FIGS. 2C and 5.

FIG. 13 is an enlarged foreshortened longitudinal sectional view of one of the hollow fibers employed in the carpet.

BEST MODE FOR CARRYING OUT THE INVENTION

Referring to the drawings, and particularly to FIGS. 1, 2A, 2B and 2C, there is illustrated, in both general and schematical forms, a hollow fiber membrane carpet manufacturing method in accordance with the present invention. Referring to the block 10 of FIG. 1 and to the diagram of FIG. 2A, the first basic step of the carpet manufacturing method that is performed is laying out a multiplicity of hollow fibers 12. There are several alternative arrangements of the hollow fibers 12 that can be provided to use in performing the first step of the method. Three of the alternative arrangements are illustrated in FIG. 2. In a first arrangement generally designated 14, the hollow fibers 12 are provided in generally side-by-side relationship to one another from a single continuous strand 15. In a second arrangement generally designated 16, the hollow fibers 12 are provided from a single continuous strand 15 in a plurality of groups 17 being spaced apart from one another so as to define empty gaps 19 between them. In a third arrangement generally designated 18, the hollow fibers 12 are provided in a textile form in which they overlap and interloop with one another. In each arrangement shown in FIG. 2A, the single lines can either represent single or individual hollow fibers 12 or a plurality of hollow fibers bunched together.

Referring to the block 20 of FIG. 1 and to the diagram of FIG. 2A, the second basic step of the carpet manufacturing method that is performed is forming a pair of strips 22, 24 of non-permeable adhesive material across the hollow fibers 12 in a spaced relationship from one another. The material of the strips 22, 24 is applied to the fibers 12 in a flowable state so as to encapsulate selected adjacent portions of the hollow fibers 12 that are aligned in two spaced apart rows.

Referring to FIG. 13, each hollow fiber 12 extending between the spaced strips 22, 24 includes an elongated tubular wall 26 having a pair of spaced opposite end portions 28, 30 which are encapsulated respectively in the strips 22, 24. The tubular wall 26 also has an elongated main portion 32 interconnecting the opposite ends portions 28, 30 of the hollow fiber 12 and extending across and through the space between the strips 22, 24. The main portion 32 of the tubular wall 26 defines an elongated internal lumen or bore 34 providing flow communication between the opposite end portions 28, 30 and thereby flow communication through the hollow fiber 12. The tubular wall 26 of each hollow fiber 12 is made of a suitable permeable material having the predetermined properties that adapt it for use in a desired application. For example, the wall 26 can be made of a plastic material that is porous and selective to mass transfer, or porous and non-selective, or non-porous and permeable to mass components. Preferably, the plastic material of the tubular wall 26 of each hollow fiber 12 is a highly crystallic thermoplastic polymer. Furthermore, the hollow fiber 12 preferably can have the range of lengths and diameters set forth in the U.S. patents by the inventor herein as were cited earlier in the background section of this application.

Referring to the block 36 of FIG. 1 and to the diagram of FIG. 2A, an optional, but preferred, step of the carpet manufacturing method that is performed is applying elongated strengthening elements 38, 40 across the selected adjacent portions of the hollow fibers 12 in spaced relationship with one another prior to forming the pair of strips 22, 24 of non-permeable adhesive material thereon. The strengthening elements 38, 40 will thereby be encapsulated by the strips 22, 24 along with the selected adjacent portions of the hollow fibers 12. The strengthening elements 38, 40 are applied across the selected adjacent portions of the hollow fibers 12 by interweaving the strengthening elements between bunches of the hollow fibers 12. The encapsulated strengthening elements 38, 40 will thus extend longitudinally through the respective strips 22, 24.

Referring to the block 42 of FIG. 1 and to the diagram of FIG. 2A, another optional, but preferred, step of the carpet manufacturing method that is performed is providing segments 22A, 24A of the strips 22, 24 free of hollow fibers 12 so that these segments can later be used to attach to suitable support members (not shown) a hollow fiber member carpet 44 (see FIGS. 6, 9 and 12) being manufactured by the method of the present invention. One exemplary way in which the fiber-free segments 22A, 24A of the strips 22, 24 are provided is by thickening short spans of the strips 22, 24 at places therealong which will form the attaching segments of the resulting carpet 44 and then lengthening these thickened spans by using any suitable means, such as pairs of rollers 46, 48, to squeeze them while the adhesive material is in the plastic or flowable state (before drying to a hardened state) to permanently reduce the thickness of the short spans and thereby cause elongation thereof to provide the segments 22A, 24A. The laying out of the hollow fibers 12 in the first step of the method, represented by block 10, can be coordinated to leave gaps between the fibers which are then bridged by the thickened spans of the strips 22, 24.

Referring to the block 46 of FIG. 1 and to the diagram of FIG. 2A, another optional, but preferred, step of the carpet manufacturing method that is performed is profiling the strips 22, 24 to form complementary matable interfitting elements 52, 54, such as tongue and groove elements, on opposite sides of each of the strips 22, 24 so that corresponding ones of the strips 22, 24 can be mated and sealably attached to one another to form an elementary carpet member 56. The elementary carpet members 56 are the fundamental building blocks or components with which the hollow fiber membrane carpet 44 of a desired configuration is later assembled. Like the lengthening step, one exemplary manner in which the profiling of strips 22, 24 is brought about is by using any suitable means, such as pairs of rollers 58, 60, to reshape the cross-section of the material of the strips 22, 24 while in the flowable state (before cured to a hardened state) so as to define the complementary matable interfitting features 52, 54 therein.

Referring to the block 62 of FIG. 1 and to the diagrams of FIG. 2B and 2C, the third basic step of the manufacturing method that is performed is cutting selected portions of the hollow fibers 12 so as to open the hollow fibers 12 to communication at least at one and preferably at both of the opposite end portions 28, 30 thereof. Any suitable means, such as severing knifes or blades 64, can be employed to cut the opposite excess portions 12A, 12B of the hollow fibers 12 extending beyond the strips 22, 24. Preferably, such severing or cutting is performed by trimming off edge portions of the strips 22, 24 with the excess portions of the hollow fibers 12.

Referring to the block 66 of FIG. 1 and to the diagrams of FIGS. 2B, 2C and 3, the fourth basic step of the carpet manufacturing method that is performed is assembling the pair of strips 22, 24 with the hollow fibers 12 extending therebetween to form the elementary carpet members 56, as seen in FIGS. 2B, 2C, 4 and 5, and then to form the elementary carpet members 56 into the hollow fiber membrane carpet 44, as seen in FIGS. 6, 9 and 12. The assembling of the elementary carpet member 56 is preferably performed by bringing and attaching the pair of strips 22, 24 together through mating of their respective complementary interfitting elements 52, 54 to one another. Alternatively, the strips 22, 24 can have relatively flat (non-profiled) surfaces which are merely adhesively attached to one another.

FIGS. 2B and 3 show the assembling of one form of the elementary carpet member by bringing the strips 22, 24 into a side-by-side relationship in which they can then be mated and/or attached to one another to form a base element 68 of the elementary carpet member 56, as shown in FIGS. 2B and 4. The strips 22, 24 are brought together by disposing them lengthwise with their longitudinal extents parallel to one another, causing the main portions 32 of the hollow fibers 12 to bend and form loops 70, as seen in FIG. 4. The loops 70 lie in individual planes which are disposed generally parallel to one another and perpendicular to the longitudinal extent of the strips.

FIGS. 2C and 3 show the assembling of another form of the elementary carpet member 56 by offsetting and bringing the strips 22, 24 into a side-by-side relationship in which they can then be mated and/or attached to one another to form the base element 68 of the elementary carpet member 56, as shown in FIGS. 2C and 5. Preferably, the strips 22, 24 are first brought together by offsetting them in opposite directions from one another along their longitudinal extent before mating their respective complementary interfitting elements 52, 54 to one another and thus prior to attaching the strips to one another. Bringing the strips 22, 24 into the offset side-by-side relationship where they are then mated and attached to one another causes the opposite end portions 28, 30 of each of the hollow fibers 12 to be offset from one another in the same opposite directions along the longitudinal extents of the strips 22, 24. The main portions 32 of the hollow fibers 12 now bend and form loops 70 which, by extending between and interconnect the respective offset opposite end portions 28, 30 now overlap with one another and are disposed in planes generally parallel to one another but at a small acute angles to the longitudinal extents of the strips 22, 24, instead of being disposed in planes that are generally parallel to one another and perpendicular to the longitudinal extent of the strips 22, 24. By such longitudinal offsetting of the strips 22, 24 relative to one another, there is a reduction of bending stresses imposed on the main portions 32 of the hollow fibers which results in a substantially reduced risk of damage to the looped hollow fibers 12.

Referring to FIGS. 4 and 5, the mating and attaching of the strips 22, 24 to one another forms the base element 68 of the elementary carpet member 56 which when mated and attached with the base elements 68 of other adjacently-disposed elementary carpet members 56 forms the support base 72 of the hollow fiber membrane carpet 44, as shown in FIGS. 6, 9 and 12. It can be readily understood that pairs of the above-mentioned encapsulated strengthening elements 38, 40 now extend longitudinally through each of the respective elementary carpet members 56 which accordingly enhances the strength and structural integrity of the support base 72 of the carpet 44 supporting the hollow fiber loops 70.

Referring to FIGS. 6-12, there is shown several different configurations of the hollow fiber membrane carpet 44 that can be assembled from the identical elementary carpet members 56 of the present invention by carrying out the above-described steps of the carpet manufacturing method of the present invention. In one embodiment, the hollow fiber membrane carpet 44 is provided in a flat configuration with the hollow fiber loops 70 extending outwardly from one side 72A of the flat support base 72 and the encapsulated end portions of the fibers being open at the opposite side 72B of the flat support base 72. In another embodiment, the hollow fiber membrane carpet 44 is provided in an annular, for example a cylindrical, configuration with the hollow fiber loops 70 extending outwardly from the outside 72A (or alternatively from the inside 72B) of the cylindrical support base 72 and the encapsulated opposite end portions of the fibers being open at the inside 72B (or alternatively at the outside 72A) of the cylindrical support base 72. The carpet 44 can just as readily be provided in other configurations as desired by users. Furthermore, distribution channels can be provided along the fiber-free segments of the carpet 44.

INDUSTRIAL APPLICABILITY

The hollow fiber membrane carpet of the present invention manufactured by the method of the present invention is adapted for use in numerous industrial applications. The broad applicability of the hollow fiber membrane carpet of the present invention to many industrial fields of use is facilitated by the ability of the method of the present invention to manufacture carpets of different sizes and configurations tailored to the particular needs and requirements of the specific industrial applications.

Some representative industrial applications are membrane absorbers for cleanup of flue gases from sulphur dioxides and nitrogen oxides, membrane systems for waste water cleanup and treatment, membrane contactors for oxygen and carbon dioxide removal from water, and membrane systems for separation of air into oxygen rich as well as oxygen lean fractions. Large scale removal of sulphur dioxides and nitrogen oxides from flue gases of coat burning power plants still is a significant problem to overcome for the protection of the environment, especially in retrofitting the existing fossil fuel burning power plants. Inexpensive sources of oxygen or oxygen-enriched air could open new horizons in environmentally friendly coal conversions. Water conditioning, especially water deaeration and deoxidation, are involved in some of the most important processes of energy production in thermal and nuclear power plants.

The best solutions to all of these problems are the ones employing membrane processes but the commercial systems presently on the market, although promising from a technical point of view, are still to expensive to find widespread use in diverse applications. It appears that membrane technology is awaiting a fundamental breakthrough in production methods before use on a broad scale can proceed and gain wide acceptance. It is such fundamental breakthrough that is believed to be provided by the modular approach to hollow fiber membrane carpet manufacture of the present invention.

The hollow fiber membrane carpets of the present invention can be used advantageously in these broad industrial applications due to the extremely high packing density of the membrane area provided and the regularity and unique space structure of the carpet textile form. These parameters determine the effectiveness of the mass transfer processes in most applications, but particularly in the applications of artificial lungs (gas-liquid membrane contactors) and artificial kidneys (liquid-liquid membrane extractors). The utility of the textile form is substantially enhanced by the reduction of back pressure effect that occurs due to the high hydraulic resistance to flows of process fluids inside of small channels of long hollow fibers.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A method of manufacturing a hollow fiber membrane carpet, comprising the steps of:

(a) laying out a multiplicity of hollow fibers;

(b) forming a pair of strips of non-permeable adhesive material on the hollow fibers in a transverse relationship thereto and in a spaced relationship from one another such that main portions of the hollow fibers extend between the spaced strips;

(c) cutting selected portions of said hollow fibers adjacent to said spaced strips so as to open said hollow fibers to communication at least at one of a pair of opposite end portions of the hollow fibers supported in the spaced strips; and (d) assembling the hollow fibers and spaced strips into a hollow fiber membrane carpet by (i) bringing and attaching the strips together in a side-by-side relationship to one another so as to form a plurality of elementary carpet members each having an elongated base element formed by the attached strips and a multiplicity of loops formed by the main portions of the hollow fibers extending from the opposite end portions thereof supported in the base element, and (ii) positioning together said elementary carpet members to provide the hollow fiber membrane carpet by attaching in side-by-side relationships the base elements of adjacent elementary carpet members to form a support base of the hollow fiber membrane carpet with the hollow fiber loops extending outwardly from a side of the support base.

2. The method of claim 1 wherein said hollow fibers are laid out in side-by-side relationship to one another.

3. The method of claim 1 wherein said hollow fibers are laid out in a textile form.

4. The method of claim 1 wherein said hollow fibers are laid out in a knitted textile form in which said hollow fibers overlap and interloop with one another.

5. The method of claim 1 wherein said hollow fibers are laid out from a single continuous thread of said hollow fiber.

6. The method of claim 1 wherein said hollow fibers are laid out in bunches in which individual hollow fibers are disposed in side-by-side relationship to one another and in which said bunches of hollow fibers are also disposed in side-by-side relationship to one another.

7. The method of claim 1 wherein said cutting selected portions of said hollow fibers adjacent to said spaced strips is performed by trimming off edge portions of the strips with said selected portions of the hollow fibers.

8. The method of claim 1 wherein said bringing of the strips together includes offsetting the strips in opposite directions from one another along their longitudinal extents prior to attaching the strips together in the side-by-side relationship.

9. The method of claim 8 wherein said offsetting of the strips longitudinally relative to one another bends the hollow fibers extending between the strips so as to provide the multiplicity of loops which overlap one another and extend in planes disposed at small acute angles to the longitudinal extents of the strips.

10. The method of claim 1 wherein said support base of the hollow fiber membrane carpet is provided in a generally flat configuration and the loops of hollow fibers extend outwardly from one side of the flat support base with the end portions of the hollow fibers being open at an opposite side of the flat support base.

11. The method of claim 1 wherein said support base of the hollow fiber membrane carpet is formed in an annular configuration and the loops of hollow fibers extend outwardly from an outside of the annular support base with the end portions of the hollow fibers being open at an inside of the annular support base.

12. The method of claim 1 further comprising:
applying a pair of elongated strengthening elements across said selected portions of said hollow fibers in a transverse relationship thereto and in a spaced relationship from one another prior to forming said pair of strips of non-permeable adhesive material to thereby encapsulate the strengthening elements with the selected portions of the hollow fibers by said forming said pair of strips such that the strengthening elements extend longitudinally through the respective strips.

13. The method of claim 12 wherein said elongated strengthening elements are applied across said selected portions of said hollow fibers by interweaving the strengthening elements between bunches of said hollow fibers.

14. The method of claim 1 further comprising:
coordinating the laying out of the hollow fibers with the forming of the strips to provide segments of the strips free of hollow fibers to define means for attaching the carpet to external support members.

15. The method of claim 14 wherein said applying of the strips includes:
providing thickened spans of the strips at places therealong which will form the attaching segments of the resulting carpet; and
lengthening the thickened spans by reducing the thickness thereof to thereby cause elongation thereof to provide the segments.

16. The method of claim 1 further comprising:
profiling said strips by forming complementary interfitting elements on opposite sides thereof so that the strips can be attached to one another to form the elementary carpet member.

17. The method of claim 16 wherein said bringing of the strips together includes mating of the respective complementary interfitting elements to one another.

18. The method of claim 16 wherein said bringing of the strips together includes offsetting the strips in opposite directions from one another along their longitudinal extents before mating the interfitting elements to one another.

19. An elementary carpet member for use in forming a hollow fiber membrane carpet, said elementary carpet member comprising:

(a) a pair of strips of non-permeable adhesive material being positioned lengthwise adjacent to one another;

(b) means for attaching said strips to one another in a side-by-side relationship to form an elongated base element; and (c) a multiplicity of hollow fibers each having a tubular wall with a pair of spaced opposite end portions and a main portion interconnecting said opposite end portions, said opposite end portions of each of said hollow fibers being supported in respective ones of said strips and extending therefrom through surfaces of said strips disposed side-by-side one another and extending in substantially the same plane, said elongated main portions of said hollow fibers being bent so as to form a multiplicity of loops extending from a side of said elongated base element formed by said attached strips.

20. The member of claim 19 wherein said strips have respective longitudinal extents and said strips are attached to one another in offset relationship in opposite directions along said longitudinal extents of said strips such that said opposite end portions of each of said hollow fibers are offset from one another in said opposite directions causing said multiplicity of loops to overlap with one another and extend in planes disposed at small acute angles to said longitudinal extents of the strips.

21. The member of claim 19 wherein said strips have respective longitudinal extents and said strips are brought together by disposing said strips lengthwise with said longitudinal extents of said strips parallel to one another causing said multiplicity of loops to extend in individual planes disposed generally parallel to one another and perpendicular to said longitudinal extents of said strips.

22. The member of claim 19 wherein said means for attaching includes complementary interfitting elements formed on a pair of opposite sides of each of said strips which matably attach said strips together to form said base element and further for matably attaching other base elements of adjacently positioned elementary carpet members to said base element of a respective one elementary carpet member to form a hollow fiber membrane carpet from a plurality of elementary carpet members.

23. The member of claim 19 further comprising:
    an elongated strengthening element encapsulated in and extending longitudinally through each of said strips forming said base element of said elementary carpet member.

24. The member of claim 19 wherein said tubular wall of each of said hollow fibers has an elongated internal bore extending through said elongated main portion and said opposite end portions providing flow communication between said opposite end portions through said main portion.

25. The member of claim 19 wherein said tubular wall of each of said hollow fibers is made of a permeable material.

26. The member of claim 19 wherein said tubular wall of each of said hollow fibers is made of a thermoplastic material.

27. A hollow fiber membrane carpet, comprising:
    (a) a plurality of elementary carpet members, each member including
        (i) a pair of strips of non-permeable adhesive material being positioned lengthwise adjacent to one another,
        (ii) means for attaching said strips to one another in a side-by-side relationship to form an elongated base element, and
        (iii) a multiplicity of hollow fibers each having a tubular wall with a pair of spaced opposite end portions and a main portion interconnecting said opposite end portions, said opposite end portions of each of said hollow fibers being supported in respective ones of said strips and extending therefrom through surfaces of said strips disposed side-by-side one another and extending in substantially the same plane, said elongated main portions of said hollow fibers being bent so as to form a multiplicity of loops extending from a side of said elongated base element formed by said attached strips; and
    (b) means for attaching said elongated base elements of said elementary carpet members to one another in a side-by-side relationship to form an elongated support base of a hollow fiber membrane carpet with said hollow fiber loops extending outwardly from a side of said support base.

28. The carpet of claim 27 wherein said strips of each of said elementary carpet member has longitudinal extents and said strips are attached to one another in offset relationship in opposite directions along their longitudinal extents such that said opposite end portions of each of said hollow fibers are offset from one another in said opposite directions causing said multiplicity of loops to overlap with one another and extend in planes disposed at small acute angles to the longitudinal extents of the strips.

29. The carpet of claim 27 wherein said strips of each of said elementary carpet members has longitudinal extents and are brought together by disposing said strips lengthwise with their longitudinal extents parallel to one another causing said multiplicity of loops to extend in individual planes disposed generally parallel to one another and perpendicular to the longitudinal extents of said strips.

30. The carpet of claim 27 wherein said means for attaching said strips of each member to one another and for attaching said members to one another includes complementary interfitting elements formed on a pair of opposite sides of each of said strips of each of said members for matably attaching said strips together to form said base element of each of said members and for matably attaching said base elements of adjacently positioned ones of said members together to form said support base of said carpet.

31. The carpet of claim 27 further comprising:
    an elongated strengthening element encapsulated in and extending longitudinally through each of said strips forming said base element of each of said elementary carpet members.

32. The carpet of claim 27 wherein said support base is formed in a generally flat configuration and said loops of said hollow fibers extend outwardly from one side of said flat support base with said oppposite end portions of said hollow fibers being open at an opposite side of said flat support base.

33. The carpet of claim 27 wherein said support base is formed in an annular configuration and said loops of said hollow fibers extend outwardly from a side of said annular support base with said end portions of said hollow fibers being open at an opposite side of said annular support base.

34. The carpet of claim 27 wherein said tubular wall of each of said hollow fibers has an elongated internal bore extending through said elongated main portion and said opposite end portions providing flow communication between said opposite end portions through said main portion.

35. The carpet of claim 27 wherein said tubular wall of each of said hollow fibers is made of a permeable material.

36. The carpet of claim 27 wherein said tubular wall of each of said hollow fibers is made of a thermoplastic material.

* * * * *